Oct. 13, 1964  R. J. COFFEY  3,152,631
STRAIGHTENING AND CUTTING OF ROD

Filed May 17, 1961  3 Sheets-Sheet 1

INVENTOR
Ralph J. Coffey
BY
ATTORNEYS

Oct. 13, 1964     R. J. COFFEY     3,152,631
STRAIGHTENING AND CUTTING OF ROD
Filed May 17, 1961     3 Sheets-Sheet 2
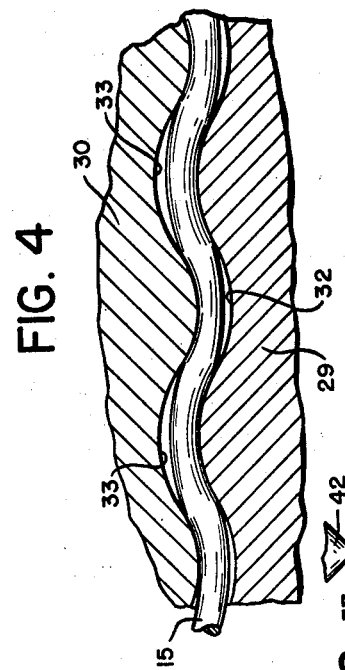
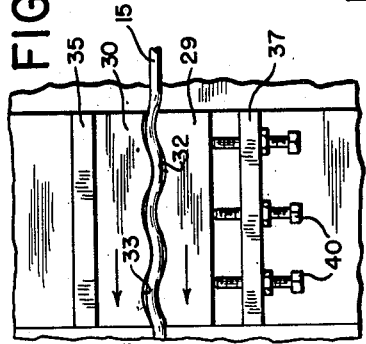
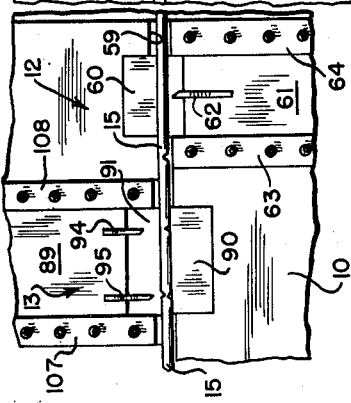
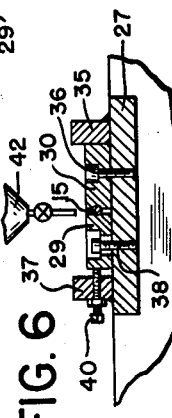
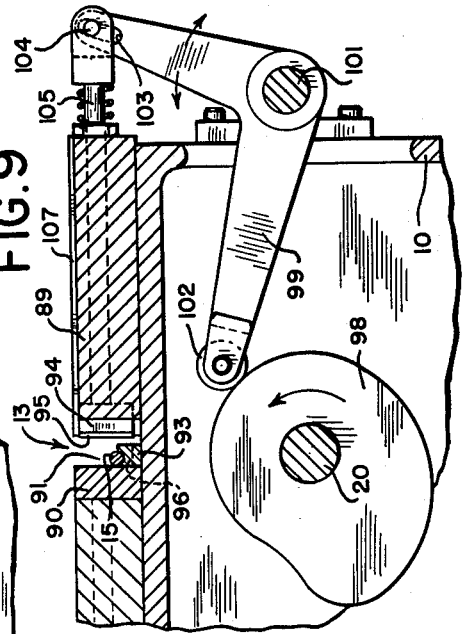
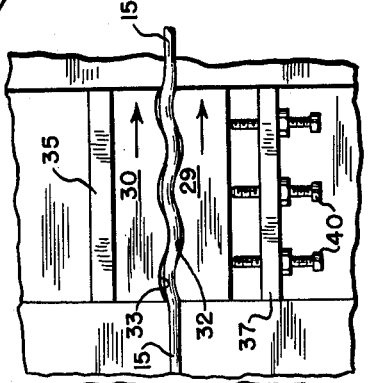
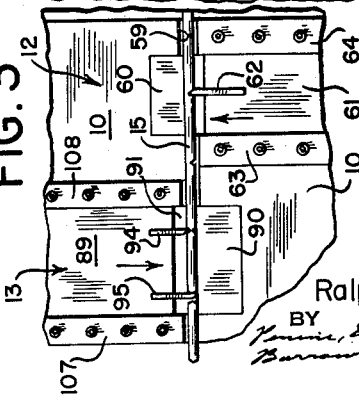
INVENTOR
Ralph J. Coffey
BY
ATTORNEYS Oct. 13, 1964 R. J. COFFEY 3,152,631
STRAIGHTENING AND CUTTING OF ROD
Filed May 17, 1961 3 Sheets-Sheet 3
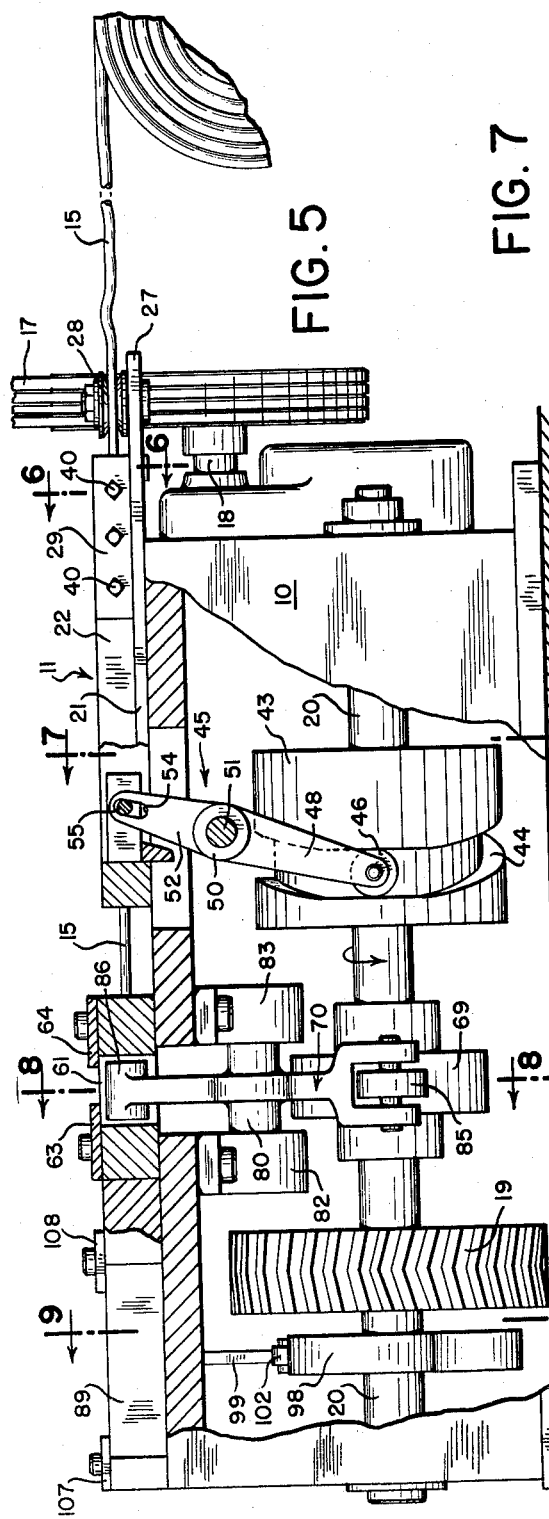
INVENTOR
Ralph J. Coffey
BY
ATTORNEYS though it is sufficient that the dies simply grip the rod tightly without deforming it. In this regard it will be noted that the dies 29 and 30 need not deform the rod into a sinuous shape conforming fully to their own configuration.

United States Patent Office 3,152,631
Patented Oct. 13, 1964

3,152,631
STRAIGHTENING AND CUTTING OF ROD
Ralph J. Coffey, York, Pa., assignor to American Chain & Cable Company, Inc., a corporation of New York
Filed May 17, 1961, Ser. No. 110,716
6 Claims. (Cl. 153—86)

This invention relates to the manufacture of straight, relatively short, uniform lengths of rod and the like. More particularly, it relates to a new method and apparatus wherein successive portions of an extended rod undergo the repetitive sequence of steps of being tightly gripped, straightened, advanced and cut to length.

Short lengths of rod, tubing, heavy wire and the like are used as stock material in many fabricating operations. Generally, such stock must be straight, free of surface scale and marks, and cut to substantially equal lengths to insure that the part or parts formed therefrom can meet uniform specifications. It is also desirable in many operations that such lengths of stock be fed subsequently in succession into forming machines for further fabrication. It is the broad purpose of this invention to provide a new method and apparatus for forming straight uniform lengths of rod and the like which fully meet these requirements.

The invention provides for the manufacture of pieces of stock from extended lengths of rod and the like which originally are in an unstraightened condition. Such rod is drawn intermittently from its reel or other source of supply and is first held fixed. A short length of the fixed rod is then quickly straightened without creating marks which might appear later on the surface of the finished article. Then the straightened portion is advanced and a length of the desired dimension is cut therefrom. At the same time, another short length is drawn from the reel. As this sequence of steps is repeated, the rod is progressively unwound from its reel and the finished pieces of stock are fed from the outlet end of the apparatus, perhaps directly into an adjacent fabricating machine.

It is characteristic of the new method that the rod is both straightened and cut in successive increments of length, rather than being straightened first throughout its entire length and subsequently cut to length. This makes it especially adaptable for use with other fabricating operations which require the intermittent feeding of stock. Also, it permits the new apparatus to be of a compact design so that it may readily be positioned next to the associated fabricating apparatus or even made a part thereof.

Broadly stated, the new method comprises tightly gripping part of an extended length of rod between opposed sizing die members. The rod is then held against longitudinal movement and a relatively short length thereof is straightened and sized by drawing the die members rearwardly a limited distance along the rod while it is thus held. The rod is next released and is longitudinally advanced by moving the sizing die members with the rod gripped thereby a distance forwardly. Then, a piece corresponding in length to the distance of movement of the die members is cut from the rod forwardly of the die members. The foregoing sequence of operations is then repeated.

In a preferred form of the new method, the rod is held forwardly of the die when restrained against longitudinal movement just prior to the sizing and straightening steps. Also, this holding operation may be accomplished by notching the rod with a suitable notching tool and leaving the tool in the notch formed thereby to hold the rod against longitudinal movement during straightening and sizing. During the later cutting step, the rod may be severed at the point where it was previously notched.

Novel apparatus is provided by the invention for carrying out the method. The apparatus comprises a reciprocable slide and a pair of opposed sizing die members mounted on the slide between which a short length of the rod may be received. Means are included for urging the die members against the rod to grip it tightly therebetween. A reciprocating arm is connected to the slide to permit the die to be moved back and forth longitudinally relative to the axis of the rod. Spaced from the dies is a frame which at least partially defines for the rod a substantially straight path of axial travel. An intermittently operable clamping device is included in the frame for releasably holding the rod against axial movement. Means synchronizing the actuation of the clamping device with rearward movement of the slide are also included in order to clamp the rod against longitudinal movement during rearward movement of the dies therealong and to release the rod during forward movement of the dies. Cutting means are mounted on the frame for severing a short length of the rod during each cycle of movement of the slide.

A preferred embodiment of the new apparatus adapted to carry out the method of the invention is described hereinbelow with reference to the accompanying drawings, wherein FIG. 1 is a perspective view of the rod straightening and cutting apparatus;

FIG. 2 is a fragmentary plan view partly broken away showing the rod just prior to notching and cutting with the sizing dies in their forward position;

FIG. 3 is a fragmentary plan view partly broken away showing the rod after it is notched and cut with the sizing dies in their rearward position;

FIG. 4 is an enlarged fragmentary plan view of the sizing dies and the length of rod gripped therebetween;

FIG. 5 is a longitudinal elevation partly broken away of the entire apparatus;

FIG. 6 is a section taken along the line 6—6 of FIG. 5;

FIG. 7 is a section taken along the line 7—7 of FIG. 5;

FIG. 8 is a section taken along the line 8—8 of FIG. 5; and

FIG. 9 is a section taken along the line 9—9 of FIG. 5.

Figure 1:
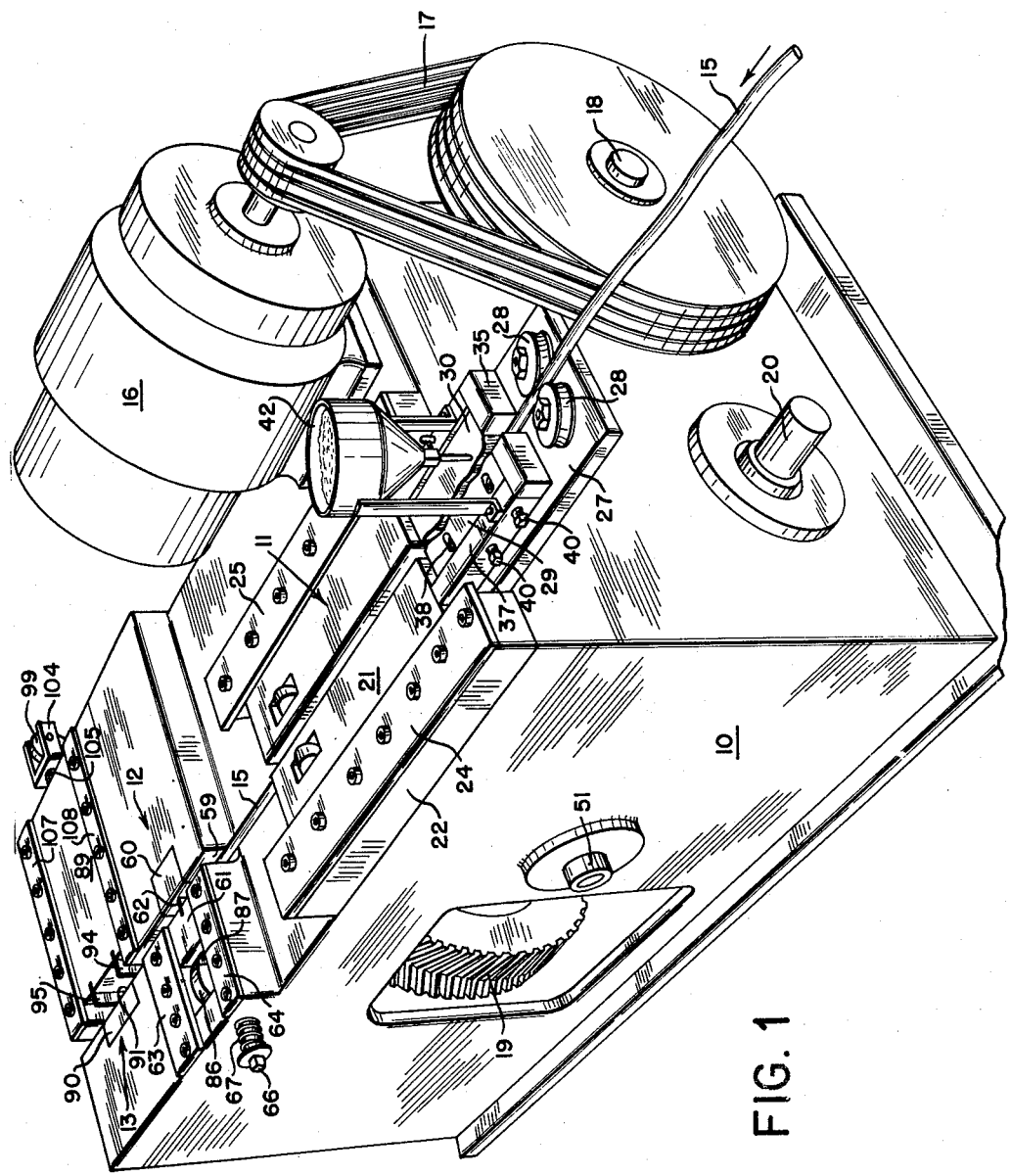

Referring first to FIG. 1, the apparatus includes generally a frame 10, reciprocable sizing and straightening means 11, a notching station 12, and a cutting station 13. A length of rod 15 is adapted to be fed to the straightening and sizing means 11 and thence to the notching and cutting stations 12 and 13. Mounted on the frame 10 is an electric motor 16 adapted by means of belts 17 to drive an auxiliary drive shaft 18. The auxiliary drive shaft 18 in turn is geared within the frame 10 to a main drive gear 19 mounted on a main drive shaft 20 that extends through the frame 10 beneath and parallel to the path of travel of the rod 15.

The straightening and sizing means 11 can be described in reference to FIGS. 1 through 7. It includes a reciprocable slide 21 held between ways 22 and 23 and retained therein by plates 24 and 25 respectively. A portion 27 of the slide 21 nearest the inlet end of the machine projects from the frame 10 and has a pair of opposed idling rolls 28 mounted thereon to guide the rod 15 into the machine. Adjacent the idling rolls 28 are a pair of sinuous dies 29 and 30 between which a short length of the rod 15 may be received. As shown in FIG. 4, the dies 29 and 30 are formed with sinuous die surfaces 32 and 33 respectively. When a short length of the rod 15 is forceably gripped between the dies 29 and 30, the sinuous die surfaces 32 and 33 may deform that length of the rod into a sinuous shape, though it is sufficient that the dies simply grip the rod tightly without deforming it. In this regard it will be noted that the dies 29 and 30 need not deform the rod into a sinuous shape conforming fully to their own configuration.

The lateral cross section through the dies may be of various shapes. For example, each of the die surfaces 32 and 33 in their lateral cross section could describe small circular seats corresponding to diametrically opposed portions of a circular rod 15. Also, the die surfaces 32 and 33 could each be flat and parallel in their lateral cross section, or one could be a circular seat as described and the other could be flat. If the latter design is employed, it is possible to flatten one side of a circular rod during its straightening and sizing within the dies.

In FIGS. 1 and 6, the die 30 is shown positioned within a block 35 which is securely affixed to the end portion 27 of the slide 21. The die 30 is also attached by means of bolts 36 to the end portion 27 of the slide and is therefore completely fixed with respect to the slide. On the other hand, the die 29 is movably positioned within another block 37 on the end portion 27 of the slide 21 by means of bolts 38 extending through slots in the die 29. Hence, the die 29 is permitted lateral displacement with respect to the die 30. A plurality of displacement screws 40 extend laterally through the block 37 and abut the movable die 29. By turning the screws 40 into the block 37, the die 29 may be forced toward the die 30 and thereby tightly grip the length of rod 15 received therebetween. Mounted on the respective blocks 35 and 37 and disposed over the inlet end of the center line of the dies is a lubricant dispenser 42 adapted to direct a suitable lubricant over the length of the rod 15 between the dies 29 and 30.

Turning now to FIGS. 5 and 7, means are shown for reciprocating the slide 21. These include a drum cam 43 mounted on the main drive shaft 20 beneath the slide 21. The drum cam 43 includes a circumferential cam groove 44 in which a pair of rotatable followers 46 and 47 are carried at diametrically opposite portions of the groove 44. The followers 46 and 47 are rotatably mounted about a common horizontal axis on a bell crank 45 at the ends of arms 48 and 49 thereof. The arms 48 and 49 depend integrally from a bushing 50 which extends over the drum cam 43 and is pivotally mounted about a lateral shaft 51 mounted at its ends in the frame 10. Extending upwardly from the bushing 50 are a pair of integral arms 52 and 53 which have slots 54 formed at their outer ends to receive wrist pins 55 and 56 mounted in apertures in the slide 21. The configuration of the cam groove 44 is such that upon rotation of the drum cam 43 the bell crank 45 oscillates forwardly and rearwardly at its upper end to reciprocate the slide 21 in the same manner.

The notching station 12 can be described with reference to FIGS. 1, 2 and 8. After leaving the straightening and sizing means 11, the rod 15 enters a channel 59 formed in the frame 10 and aligned with the center line of the slide 21. The channel 59 is partly defined by an anvil block 60 on one side thereof. Opposite the anvil block 60 is a longitudinally displaceable slide 61 in which is located a vertically arranged projecting notching tool 62. The slide 61 is adapted to move laterally back and forth beneath plates 63 and 64 which are bolted to the frame 10. A bar 66 extends from the slide 61 and retains a helical compression spring 67 adapted to urge the slide 61 normally toward the anvil block 60.

The slide 61 is actuated by a cam 69 affixed to the main drive shaft 20 and also by an associated bell crank 70. The bell crank 70 is pivotally mounted about a shaft 80 located at its opposite ends in bearings 82 and 83 which are affixed to the frame 10. At its lower end, the bell crank 70 is provided with a rotatable follower 85 adapted to roll about the periphery of the cam 69 as the cam rotates. At its opposite end, the bell crank 70 is provided with a knob 86 which extends upwardly into an aperture within the slide 61. The knob 86 includes a hard insert 87 which engages the slide 61 during the forward stroke. The cam 69 is configured in such a manner that the bell crank 70 urges the slide 61 toward the anvil block 60 to notch the portion of the rod therebetween by means of the notching tool 62. The cam is also configured to accomplish this notching operation immediately after the drum cam 43 has moved the slide 21 to the forwardmost position of its stroke. Moreover, the cam 69 is adapted to hold the slide 61 and notching tool 62 stationary for a limited period after the notch is made so that the notching tool 62 is not released from the rod 15 until immediately after the drum cam 43 has carried the slide 21 to the rearwardmost portion of its stroke.

Referring now to FIGS. 1, 5 and 9, the cutting means include a large slide 89 mounted on the frame 10 on the opposite side of the center line of the apparatus from the slide 61. The slide 89 is opposed to an anvil block 90 and defines therewith a channel 91 which receives the notched rod after it leaves the notching station 12. Within the channel 91 is a longitudinally extending track element 93 over which the rod is adapted to slide throughout its travel in the cutting station 12. A pair of hardened cutting tools 94 and 95 are mounted in the slide 89 and are spaced apart relative to the axis of the rod a distance equal to the length of the stock to be cut from the rod. The first cutting tool 94 is also spaced longitudinally from the notching tool 62 a distance which is equal to or is a multiple of the stroke of the slide 21. When actuated, the cutting tools 94 and 95 are adapted to slide into corresponding slots 96 (one of which is shown in cross section in FIG. 9). The first cutting tool 94 projects from the slide 89 a distance less than the second cutting tool 95 so that the first cutting tool 94 cuts partially into and the second cutting tool 95 entirely severs the rod when the slide 89 is urged forwardly. Hence, during this two-stage cutting operation, the first cutting tool 94 is directed partially into its slot 96 in the track element 93 whereas the cutting tool 95 carries fully into its slot and abuts the anvil block 90.

To actuate the slide 89, a cam 98 is affixed to the main drive shaft 20 beneath the slide 89 and is associated with a bell crank 99 mounted about a shaft 101 secured to the outside of the frame 10. The bell crank 99 includes a follower 102 adapted to ride over the periphery of the cam 98. At the opposite end of the bell crank 99 is a slot 103 which receives a wrist pin 104 mounted on a rod 105 affixed to and extending laterally from the slide 89. The slide 89 is retained to the frame 10 by means of lateral plates 107 and 108.

To properly synchronize the action of the cutting station 13 with the other elements of the apparatus, the cam 98 is configured such that it moves the slide 89 forwardly into cutting position by means of the bell crank 99 at the same time that the rod is notched within the notching station 12. Moreover, the cam 98 holds the slide 89 in cutting position for the same length of time that the notching tool is retained in notching position, i.e. during the period in which the slide 21 is carried back to its rearwardmost position. Also, the cutting tools 94 and 95 are spaced longitudinally apart a distance equal to the length of the piece of stock desired, which distance is also equal to the stroke of the slide 21.

The operation of the new apparatus is as follows: First, a length of the rod 15 is drawn from its reel or other source of supply and is inserted between the idling rollers 28. A sufficient length of the rod is then directed through the open dies 29 and 30 such that the end portion of the rod projects well beyond the end of the slide 21 nearest the notching station 12. The screws 40 are then tightened so that the displaceable die 29 is urged toward the fixed die 30. The length of the rod 15 therebetween is thereby gripped tightly by the dies and may be deformed into sinuous shape as shown in FIG. 4. The screws 40 are left in their tightened condition.

After the apparatus has been set up in this manner, the motor 16 is activated and the main drive shaft 20 is driven by means of the motor 16 acting through the auxiliary drive shaft 18 and main drive gear 19. Consequently, each of the cams 43, 69 and 98 proceed to rotate. The drum cam 43 causes the bell crank 45 to move the slide 21 into its forwardmost position and, as it does so, the rod 15 is drawn forwardly since it is gripped securely between the sinuous dies 29 and 30. At the forward end of the stroke of the slide 21, the projecting end portion of the rod 15 enters the notching station 12 as shown in FIG. 2 and at that point, the cam 69 pivots the bell crank 70 to cause the notching tool 62 to cut partly into the end portion of the rod therewithin.

Next, the drum cam 43 urges the slide 21 rearwardly to the position shown in FIG. 3 and the notching tool 62 remains in the notch which it formed to hold the rod fixed within the notching station 12. Thus, as the slide 21 moves rearwardly the rod 15 is longitudinally fixed and the dies 29 and 30 progressively pass over a length of the rod 15. This causes that length of the rod to be straightened by a combination of (1) the tension imposed upon it, (2) the stripping action of the tightly gripping dies passing over it, and (3) the successive sinuous deformation (if any) and pulling exerted on it. The length of the rod so straightened may be formed with a flat along one side thereof, if desired.

Immediately after the slide 21 returns to its rearwardmost position, the cam 69 causes the notching tool 62 to retract and release the rod within the notching station. The slide 21 comes forward again during the next revolution of the drum cam 43 and draws another length of the rod from its reel or other source of supply. The portion of the rod which was just straightened is moved forwardly into the notching station 12 and the previously notched portion of the rod is moved into the cutting station 13. The previously formed notch stops within the cutting station 13 directly opposite the first cutting tool 94 when the slide 21 reaches its forwardmost point of travel. The cam 98 then pivots the bell crank 99 to move the cutting tools forwardly such that the cutting tool 94 partially severs the rod at the point where it was previously notched. Simultaneously with this partial cutting, the previously straightened portion of the rod is notched within the notching station 12.

Once more, the slide 21 moves rearwardly to straighten another length of the rod as the rod is held fixed longitudinally by the notching tool within the notching station 12. When the slide 21 is again at its rearwardmost position, the notching tool retracts within the cutting station and the slide 89 within the cutting station also retracts to release the cutting tool 94 from the rod. The slide 21 moves forwardly again, and the portion of the rod partially severed by the cutting tool 94 stops at a point opposite the second cutting tool 95 and, at the same time, the previously notched portion of the rod stops at a point opposite the first cutting tool 94. The cam 98 then actuates the slide 89 so that the rod is severed by the cutting tool 95 where previously partially severed and is partially severed by the cutting tool 94 where previously notched.

It is evident, therefore, that the notching and cutting tools are actuated whenever the slide 21 arrives at its forwardmost position and they remain in that position until the slide 21 reaches its rearwardmost position. Consequently, successive lengths of the rod are first straightened, then notched, then partially severed, and then completely severed. This requires, of course, that the stroke of the slide 21 be equal to the distance between the cutting tools 94 and 95 and the distance between the notching tools 62 and the first cutting tool 94 be equal to or be a multiple of the stroke of the slide 21. All of the operations performed are synchronized precisely by the common drive shaft.

I claim:

1. A method of making straight relatively short lengths of accurately sized rod which comprises tightly gripping part of an extended length of rod between opposed sinuous sizing die members, notching said rod forwardly of said gripped part and holding said rod where notched against longitudinal movement, straightening and sizing a relatively short length of said rod by drawing said die members rearwardly a limited distance along said rod while it is thus held, then releasing said rod and longitudinally advancing it by moving said sizing die members with the rod gripped thereby a distance forwardly, cutting from said rod forwardly of said die member a piece corresponding in length to the distance of movement of the die members, and repeating the foregoing sequence of operations.

2. A method of making straight relatively short lengths of accurately sized rod which comprises tightly gripping part of an extended length of rod between opposed sinuous sizing die members, notching said rod forwardly of said gripped part and holding said rod where notched against longitudinal movement, straightening and sizing a relatively short length of said rod by drawing said die members rearwardly a limited distance along said rod while it is thus held, then releasing said rod and longitudinally advancing it by moving said sizing die members with the rod gripped thereby a distance forwardly, cutting said rod at the notched portion forwardly of said die member to sever a piece corresponding in length to the distance of movement of the die members, and repeating the foregoing sequence of operations.

3. Apparatus for making straight substantially uniform lengths of accurately sized rod comprising a reciprocable slide, a pair of opposed sinuous sizing die members mounted on said slide between which a short length of said rod may be received, means for urging said die members against the rod to grip it tightly therebetween, a reciprocating arm connected to said slide, whereby said die may be moved back and forth longitudinally relative to the axis of the rod, a frame spaced from said dies and at least partially defining a substantially straight path of axial travel for the rod, an intermittently operable notching device in said frame for notching said rod and releasably holding it against axial movement, means synchronizing actuation of said notching device with rearward movement of said slide, whereby said rod is clamped against longitudinal movement during rearward movement of the dies therealong and is released to be fed forward during forward movement of the dies, and cutting means mounted in said frame for severing a short length from the rod during each cycle of movement of the slide.

4. Apparatus for making straight substantially uniform lengths of accurately sized rod comprising a reciprocable slide, a pair of opposed sinuous sizing die members mounted on said slide between which a short length of said rod may be received, means for urging said die members against the rod to grip it tightly therebetween, a reciprocating arm connected to said slide, whereby said die may be moved back and forth longitudinally relative to the axis of the rod, a frame spaced from said dies and at least partially defining a substantially straight path of axial travel for the rod, an intermittently operable notching device in said frame for notching said rod and releasably holding it against axial movement, cutting means mounted in said frame for severing a short length from the rod, and cam means synchronizing actuation of said notching device and said cutting means with movement of said slide, whereby said rod is cut and clamped against longitudinal movement during rearward movement of the dies therealong and is released to be fed forward during forward movement of the dies.

5. Apparatus for making straight substantially uniform lengths of accurately sized rod comprising a frame, a shaft rotatably mounted within said frame, driving means for imparting rotation to said shaft, a reciprocable slide mounted on said frame, a pair of opposed sinuous sizing die members mounted on said slide between which a short length of said rod may be received, means for urging said die members against the rod to grip it tightly therebetween, a reciprocating arm connected to said slide, first cam means on said shaft for reciprocating said arm to move said dies back and forth longitudinally relative to the axis of the rod, said frame at least partially defining a substantially straight path of axial travel for the rod, a laterally movable notching tool on said frame for notching said rod and releasably holding it against movement, second cam means on said shaft for intermittently actuating said notching tool, cutting means mounted in said frame for severing a short length from the rod, third cam means on said shaft for intermittently actuating said cutting means, said cam means being synchronized such that said rod is cut and clamped against longitudinal movement during rearward movement of the dies therealong and is released to be fed forward during forward movement of the dies.

6. Apparatus for making straight substantially uniform lengths of accurately sized rod comprising a frame, a shaft rotatably mounted within said frame, driving means for imparting rotation to said shaft, a reciprocable slide mounted on said frame, a pair of opposed sinuous sizing die members mounted on said slide between which a short length of said rod may be received, means for urging said die members against the rod to grip it tightly therebetween, a reciprocating arm connected to said slide, first cam means on said shaft for reciprocating said arm to move said dies back and forth longitudinally relative to the axis of the rod, said frame at least partially defining a substantially straight path of axial travel for the rod, a laterally movable notching tool on said frame for notching said rod and releasably holding it against movement, second cam means on said shaft for intermittently actuating said notching tool, cutting means mounted in said frame for severing a short length from a rod, third cam means on said shaft for intermittently actuating said cutting means, said notching tool and said cutting means being spaced apart along the path of travel of said rod a distance equal to a multiple of the stroke of the rod, said cam means being synchronized such that said rod is cut and clamped against longitudinal movement during rearward movement of the dies therealong and is released to be fed forward during forward movement of the dies.

References Cited in the file of this patent

UNITED STATES PATENTS

| | | |
|---|---|---|
| 1,568,254 | Taylor | Jan. 5, 1926 |
| 1,664,717 | Wiberg | Apr. 3, 1928 |
| 1,917,624 | Webb | July 11, 1933 |
| 2,172,134 | Wright | Sept. 5, 1939 |
| 2,393,702 | Naegeli | Jan. 29, 1946 |
| 2,922,460 | Schwendenwein | Jan. 26, 1960 |